United States Patent [19]

Boss

[11] 4,203,573
[45] May 20, 1980

[54] REVERSIBLE MOTOR OPERATED VALVE WITH SPRING ASSIST

[75] Inventor: Gary R. Boss, New Berlin, Wis.

[73] Assignee: Erie Manufacturing Company, Milwaukee, Wis.

[21] Appl. No.: 735,794

[22] Filed: Oct. 26, 1976

[51] Int. Cl.² .......................... F16K 31/02; F03G 1/06
[52] U.S. Cl. .......................................... 251/133; 74/2; 74/625; 185/40 R; 251/249.5
[58] Field of Search .............. 74/100, 2, 99, 520, 74/625; 185/11, 40 R; 251/248, 249.5, 250.5, 68, 69, 133, 134, 129

[56] References Cited

U.S. PATENT DOCUMENTS

| | | | |
|---|---|---|---|
| 1,144,205 | 6/1915 | Johnson | 185/11 |
| 2,152,699 | 4/1939 | Kuester et al. | 237/2 R |
| 2,218,682 | 10/1940 | Medson | 251/249.5 |
| 2,488,596 | 11/1949 | Hungate | 74/100 |
| 2,612,338 | 9/1952 | Flosdorf et al. | 251/249.5 |
| 2,738,033 | 3/1956 | Towle et al. | 251/134 |
| 2,804,173 | 8/1957 | DeMillar | 185/40 R |
| 2,904,956 | 9/1959 | Zenor | 185/40 R |
| 3,042,357 | 7/1962 | Engholdt | 236/74 X |
| 3,090,558 | 5/1963 | Vaughn | 236/74 |
| 3,159,244 | 12/1964 | Anderson | 185/11 |
| 3,176,720 | 4/1965 | Donahue | 251/133 |
| 3,248,080 | 4/1966 | Plasko | 251/133 |
| 3,430,916 | 3/1969 | Raymond, Jr. | 251/134 |
| 3,679,852 | 7/1972 | Himi et al. | 185/40 R |
| 3,732,949 | 5/1973 | Williams | 185/40 R |
| 3,889,924 | 6/1975 | Karpenko | 251/249.5 |

Primary Examiner—Martin P. Schwadron
Assistant Examiner—G. L. Walton
Attorney, Agent, or Firm—Michael, Best & Friedrich

[57] ABSTRACT

A reversible motor operated valve with a spring assist. The assist spring is provided to store energy therein as the motor actuates the valve from its closed to its open position. When the motor is reversed to actuate the valve back from its open to its closed position, the energy stored in the spring will be released to assist the motor in closing the valve.

3 Claims, 3 Drawing Figures

4,203,573

REVERSIBLE MOTOR OPERATED VALVE WITH SPRING ASSIST

BACKGROUND OF THE INVENTION

I. Field of the Invention

This invention relates to a reversible motor operated valve with a spring assist.

II. Description of the Prior Art

A novelty search directed to the subject matter of this application uncovered the following U.S. Pat. Nos.:

1,728,015
2,029,465
2,152,699
3,042,357

None of the prior art uncovered in the search discloses a motor operated valve wherein the valve is driven by a reversible motor provided with a spring assist to store energy when the valve is actuated from its closed to its open position and to release energy when the valve is actuated from its open to its closed position to thereby assist the motor in such valve closing. Drive motors of smaller size can be used than would otherwise be the case.

SUMMARY OF THE INVENTION

A motor operated valve including a valve casing having an inlet, an outlet and a valve seat therein. A valve element is pivotally mounted in the casing on a valve stem to control flow therethrough. The valve is actuated by a reversible motor drive having an output shaft which can be driven in both a clockwise and a counterclockwise direction. A gear arrangement is provided so that when the motor drive shaft is driven in one direction or the other, the valve stem on which the valve unit is mounted will be rotated to cause the valve element to move between its closed and open positions. A torsion assist spring is provided to store energy when the valve element is rotated from its closed to its open position and to release such stored energy when the valve element is rotated from its open to its closed position to thereby assist the motor unit in driving the valve stem in the valve closing direction.

DESCRIPTION OF THE PREFERRED EMBODIMENT

Figure 1:
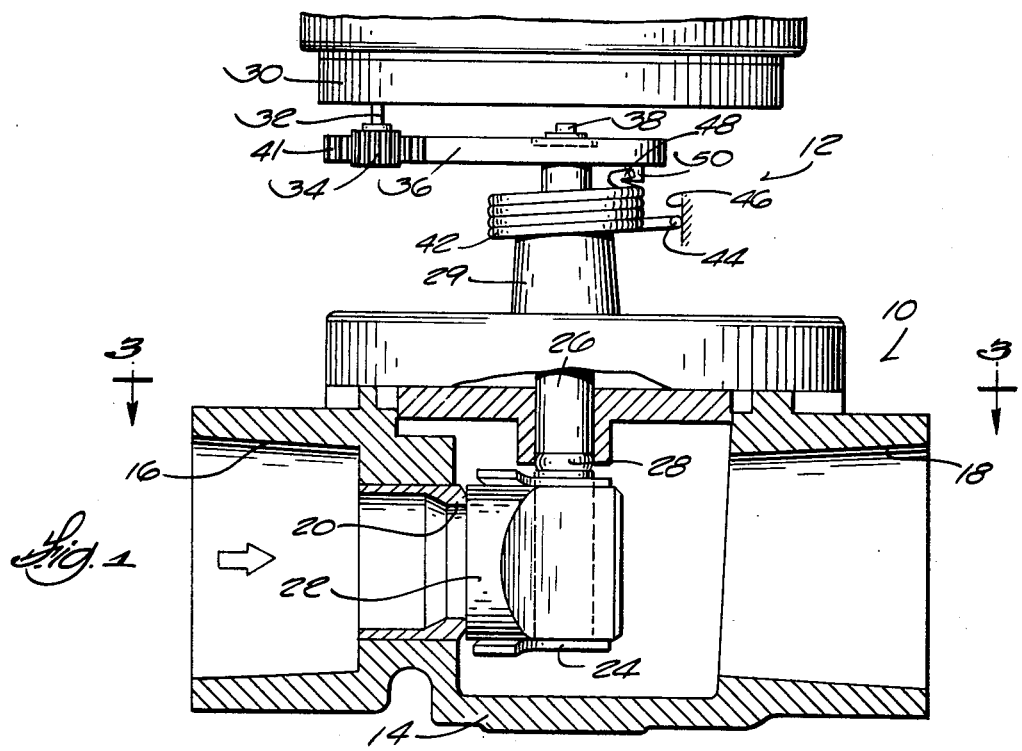
FIG. 1 is a side elevation view (with parts broken away) of the motor operated valve of the present invention.

Referring to FIG. 1, the unit of the present invention is comprised of a valve 10 and a reversible motor driven actuating mechanism 12 therefor.

Valve 10 is comprised of a casing 14 having an inlet 16 and an outlet 18. A valve seat member 20 is mounted in casing 14 and cooperates with a movable valve member 22 to control fluid flow through the valve.

Valve member 22 is pivotally mounted for movement into and out of sealing engagement with valve seat 20 by means of a bracket member 24 and a stem 26. Stem 26 is rotatably mounted in casing 14 and sealed therein by an O-ring member 28 and extends upwardly out of the casing through bushing portion 29.

Reversible motor actuating mechanism 12 is comprised of a reversible electric motor drive unit 30 (shown partially) having a drive shaft 32 extending downwardly therefrom on which a drive pinion gear 34 is mounted. Reversible motor drive unit 30 can be of any suitable design and is mounted on valve 10 by any suitable mounting means (not shown).

A segment gear drive arm 36 is mounted on the flat-sided end portion 38 of stem 26 and retained thereon by a snap-type retaining ring member 40.

Figure 2:
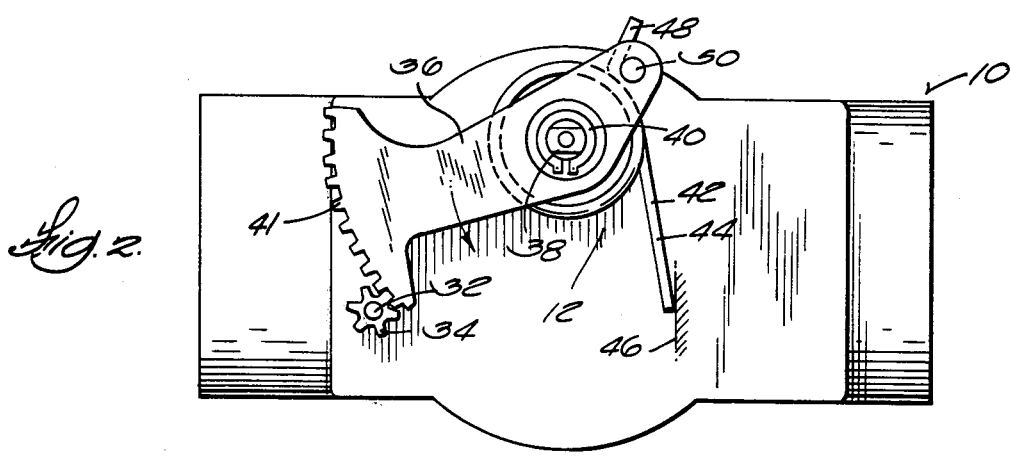
FIG. 2 is a top plan view of the motor operated valve shown in FIG. 1.
Figure 3:
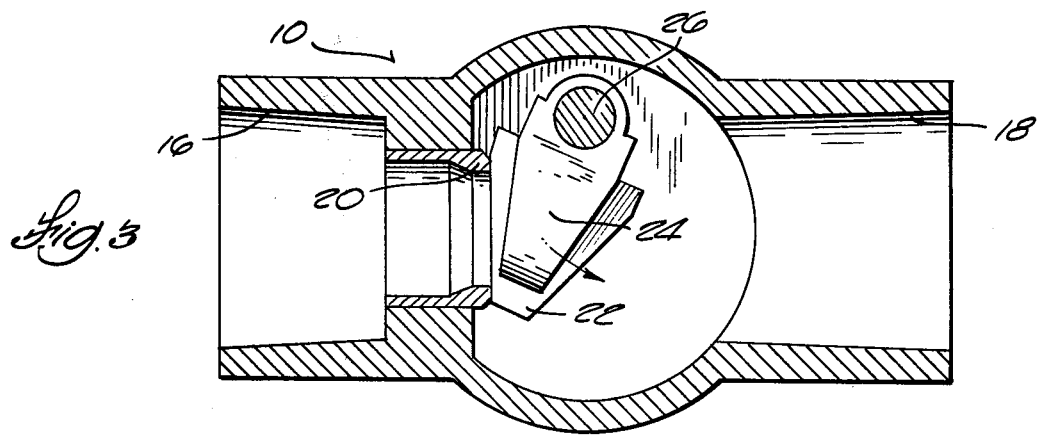
FIG. 3 is a sectional view taken along line 3—3 of FIG. 1.

Drive arm 36 has a segmental gear tooth portion 41 positioned in driven engagement with motor output pinion gear 34 as best shown in FIG. 2.

A torsion-assist spring 42 is mounted on bushing portion 29 of casing 14 directly beneath segment gear drive arm 36. One end 44 of spring 42 is positioned in engagement with a stationary stop 46 and the other end 48 of spring 42 is positioned in engagement with a pin 50 mounted in drive arm 36 (FIG. 2).

OPERATION

The present invention is particularly designed for use in relatively large fluid control valve wherein a reversible motor is used to drive the valve in both its opening and closing directions. In such applications the force required to drive the valve in its closing direction is generally considerably greater than the force required to drive it in the opening direction.

In the present invention the valve 10 is actuated from its closed to its open position by energization of reversible motor unit 30 in a direction causing motor drive pinion 34 to rotate in a clockwise direction as viewed in FIG. 2. This will cause segment gear drive arm 36 (and stem 26) to rotate in a counterclockwise direction as viewed in FIG. 2. The assist spring 42, as mounted as shown in FIG. 2, will store energy therein as the motor unit 30 actuates the valve from its closed to its open position. Thus when the motor unit is reversed to actuate the valve element 22 back from its open to its closed position the energy stored in the spring 42 will be released to assist the motor in closing the valve. The result is that a motor of substantially smaller size can be employed to operate any given valve as compared to the size of the motor required to operate such valve without the torsion assist spring as described above.

I claim:

1. A motor operated valve comprising:

a valve means including a casing having an inlet, an outlet and a valve seat therein, said valve means further including a valve element movably mounted in said casing to control flow therethrough, said valve member mounted for pivotal movement into and out of sealing engagement with said valve seat by means of a valve stem rotatably mounted in said valve casing and extending through said casing to the exterior thereof; and a reversible motor driven actuating means for said valve means, said actuating means including a reversible motor drive unit having an output drive shaft which can be driven in both a clockwise and a counterclockwise direction, said actuating means further including a gear means to operatively connect said motor drive shaft to said valve stem of said valve means so that when said drive shaft of said motor unit is driven in one direction or the other, said valve stem will be rotated to cause said valve element to move between its closed and open position, said actuating means further including a torsion assist spring mounted on the axis of said valve stem, said assist spring adapted to store energy therein continuously as said valve element is rotated from its closed to its open position and to release such stored energy therefrom continuously as said valve element is rotated from its open to its closed position and said assist spring and said actuating means drive the valve stem in the valve closing direction.

2. A motor operated valve according to claim 1 in which said gear means of said actuating means includes a drive pinion gear mounted on said motor drive shaft and a segment gear drive arm mounted on the portion of said valve stem which extends exteriorly of said valve casing, said drive arm having a segmental gear tooth portion positioned in driven engagement with said drive pinion gear.

3. A motor operated valve according to claim 2 in which said tension assist spring of said actuating means is comprised of a torsion spring having one end thereof bearing against a stationary stop member and the other end thereof bearing against said segment gear drive arm.

* * * * *